United States Patent

Kuo

[11] Patent Number: 6,134,748
[45] Date of Patent: Oct. 24, 2000

[54] PULLMAN CASE STEERING WHEEL DEVICE

[75] Inventor: Chung-Hsien Kuo, Taipei, Taiwan

[73] Assignee: Chaw Khong Technology Co., Ltd., Taipei County, Taiwan

[21] Appl. No.: 09/236,323

[22] Filed: Jan. 25, 1999

[30] Foreign Application Priority Data

May 14, 1998 [TW] Taiwan .................................. 87207502
Aug. 26, 1998 [TW] Taiwan .................................. 98218829

[51] Int. Cl.[7] .................................................... B60B 33/00
[52] U.S. Cl. .................................. 16/35 R; 16/34; 16/44; 16/35 D
[58] Field of Search ................................. 16/35 R, 35 D, 16/44, 34; 280/271, 263

[56] References Cited

U.S. PATENT DOCUMENTS

| 940,783 | 11/1909 | Buckland | 280/271 |
|---|---|---|---|
| 1,230,801 | 6/1917 | Schriver | 280/271 |
| 2,482,961 | 9/1949 | Bishop | 280/271 |
| 4,037,291 | 7/1977 | Huempfner et al. | 16/35 R |
| 4,212,093 | 7/1980 | Lombard | 16/35 D |
| 4,246,677 | 1/1981 | Downing et al. | 16/35 R |

Primary Examiner—Chuck Y. Mah
Attorney, Agent, or Firm—Dougherty & Troxell

[57] ABSTRACT

An automatically retractable swivelling wheels device of a pullman case is disclosed. The swivelling wheels device comprises a bushing, in which a spring retainer is formed on a bottom of a circumferential flange of the bushing, a wheel housing assembly and a swivelling wheels. The swivelling wheels is permitted to swing in any direction as the pullman case moved by a force, and once the force is removed, the swivelling wheels is automatically returned to its original direction by the cooperation of the restoration force of two out of shape springs provided in a C shaped groove of the wheel housing assembly with the spring retainer therebetween in order for the swivelling wheels to be retracted to a recess of the pullman case.

4 Claims, 6 Drawing Sheets

PULLMAN CASE STEERING WHEEL DEVICE

BACKGROUND OF THE INVENTION

1. Field of the Invention

The present invention relates to a retractable wheel device of luggage, and more particularly, to an automatically retractable steering wheel device of a pullman case.

2. Description of Related Art

Luggage is commonly carried by travellers. Further, a luggage with wheels mounted is very popular among travellers in recent years. Generally, those luggage are equipped with two wheels. When in use, a traveller simply pulls a telescopic frame of a luggage up and then pulls it with a single hand. Such a luggage is much labor-saving as compared with the luggage lifted by a hand. However, such a luggage equipped with two wheels is simply designed for light weight occasion. With regard to the heavy luggages, a pullman case with four wheels mounted becomes available.

A prior art of a four-wheeled pullman case A is shown in FIG. 1. In general, a pullman case A comprises a telescopic frame B, a luggage body C, a wheel bracket D, two retractable swivelling wheels E, and two main wheels F. The main wheels F are mounted in two wheel housing F1 at the two rear lower corners of the pullman case A respectively; while the retractable swivelling wheels E are mounted between the main wheels F.

FIG. 2 is a perspective view of the pullman case A of FIG. 1 with the wheel bracket D extended. As illustrated, the swivelling wheels E are mounted on two bottom corners of the wheel bracket D respectively. The wheel bracket D has a supporting bracket D2, which is hinged to the luggage body C with a hinge D1, a retractable hinge D3 for drawing back or extending the supporting bracket D2, and two half spherical recesses D4 for receiving two retracted swivelling wheels E1.

It is commonly designed that the two wheel housing F1 of the main wheels F are fixed on the luggage body C. The wheel hub E2 and the swivelling wheels E1 are allowed to swivel together freely. The drawback of the pullman case A of the prior art is that the swivelling wheels E1 cannot be made to go back to the recesses D4 by simply retracting the wheel bracket D due to the fact that the swing angles of the swivelling wheels E1 are instantly arbitrary. This will cause the swivelling wheels E1 not to be aligned with the recesses D4. Resultantly, it is required to manually adjust the swivelling wheels E1 in order to retract them into the recesses D4.

Thus, it is desirable to provide an automatically retractable swivelling wheels device of a pullman case to overcome such drawback of the prior art.

SUMMARY OF THE INVENTION

The principle object of the present invention therefore is to provide an automatically retractable swivelling wheels device. The swivelling wheels device comprises a bushing, in which a spring retainer is formed on the bottom of a circumferential flange of the bushing, a wheel housing assembly, a swivelling wheels. The swivelling wheels is permitted to swing in any direction depending on how the pullman case is moved by a force. And once the force is removed, the swivelling wheels is automatically returned to point to its original direction by the cooperation of the restoration force of two elongated springs situated in a C shaped groove of the wheel housing assembly connected by a separator.

The objects, features and advantages of the present invention will become apparent from the following detailed description accompanying with the drawings.

DETAILED DESCRIPTION OF THE PREFERRED EMBODIMENTS

The present invention is directed to an automatically retractable swivelling wheels device. The description of other parts of the pullman case is omitted in order to simplify the teaching of the present invention.

Figure 3:
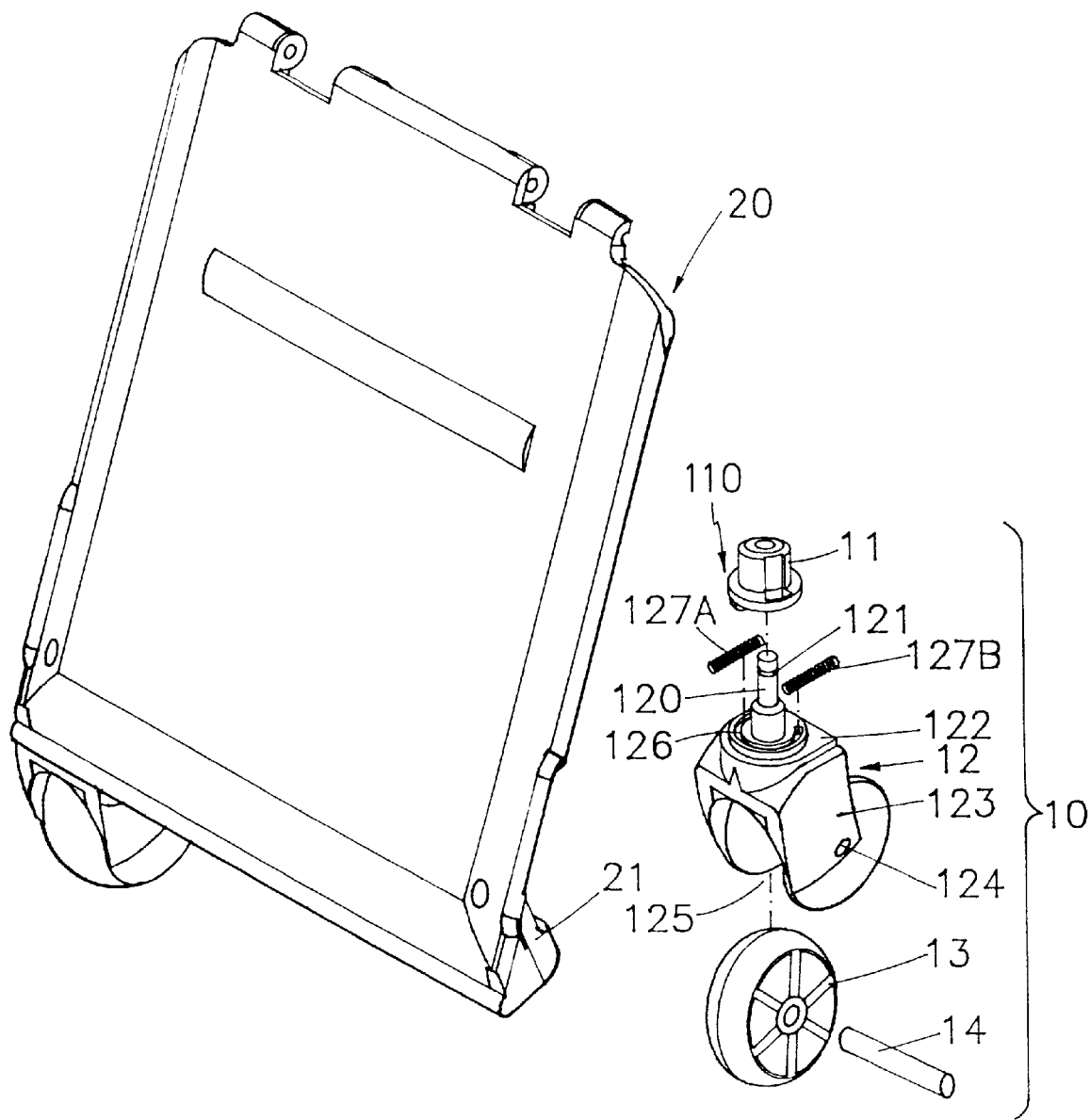
FIG. 3 is an exploded view of the swivelling wheels of the present invention.

Referring to FIG. 3, the swivelling wheels device 10 is mounted in an oblique tube 21 of a supporting plate 20. The swivelling wheels device 10 comprises a bushing 11 for being inserted into the oblique tube 21, a wheel housing assembly 12, a swivelling wheels 13, and a pin 14. The wheel housing assembly 12 comprises a rotating shaft 120, with a circumferential recessed portion 121 formed on an outer surface thereof, formed on a center of a surface of the wheel housing assembly 12 for being inserted into the bushing 11 which, a body 122 formed under the rotating shaft 120, a wheel hub 123 extended downwardly from the body 122 with two holes 124 formed in the center of each side thereof, in which a conjugate relation is formed between two sides of the wheel hub 123, a C shaped groove 125 formed on the junction surface of the body 122 and the bushing 11, and two helical springs 127A and 127B. The pin 14 is inserted from one hole 124 through the wheel 13 to the other hole 124. Such that the wheel 13 is provided pivotedly within the wheel housing assembly 12.

Figure 4:
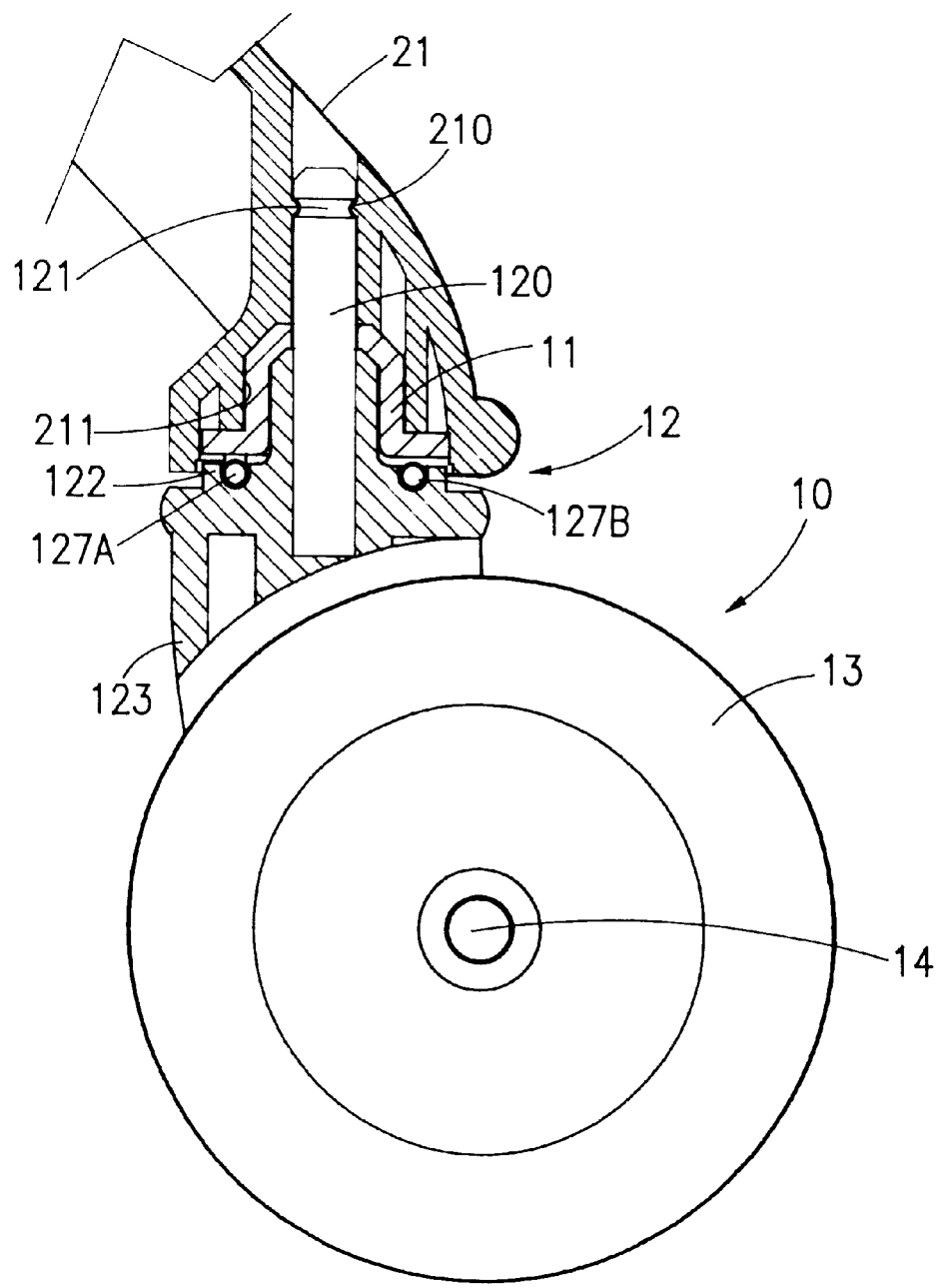
FIG. 4 is cross-sectional view of the swivelling wheels of the present invention when it engaged with a supporting plate.

As shown in FIG. 4, the bushing 11 is inserted into an inner tube 211 of the oblique tube 21. Further, the circumferential recessed portion 121 is engaged with a circumferential raised portion 210 of the oblique tube 21 correspondingly. It is known that the wheel 13 is permitted to rotate around the pin 14 and the wheel housing 12 is permitted to rotate around the shaft 120 within the bushing 11.

According to the present invention, the swivelling wheels device 10 is permitted to swing in any angle as the pullman case (not shown) moves.

Figure 5:
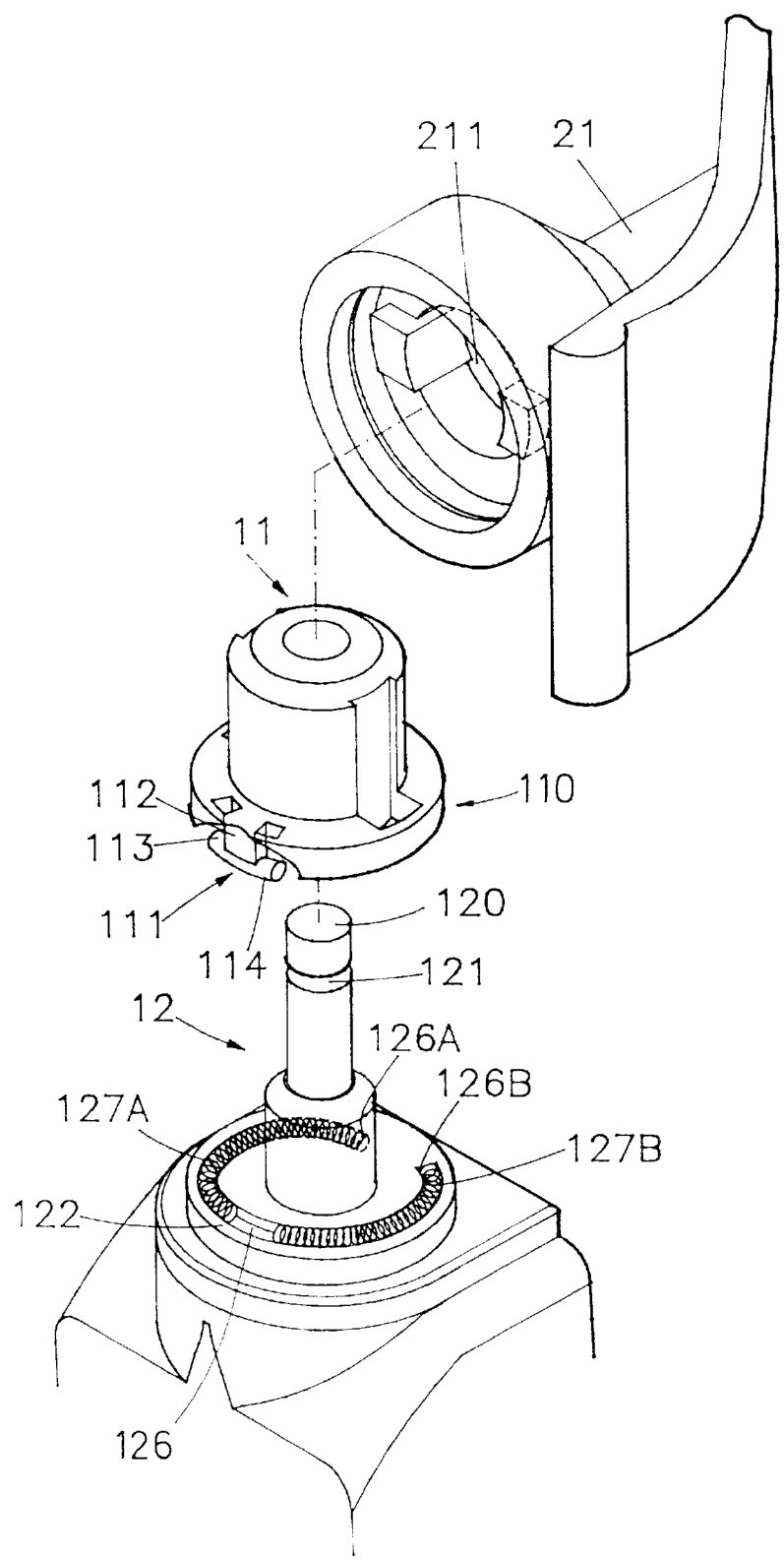
FIG. 5 is a partial, exploded view of the swivelling wheels of the present invention.

Refer to FIG. 5, which shows two springs 127A and 127B mounted on a left side and a right side of the C shaped groove 126 respectively. A spring retainer 111 is formed on a bottom of a circumferential flange 110 of the bushing 11. A center portion 112 of the retainer 111 is integrally formed with the bushing 11. Two ends 113 and 114 of the retainer 111 are free in order to be inserted into the springs 127A and 127B respectively. The center portion 112 is disposed correspondingly to the center of the C shaped groove 126.

Figure 6A:
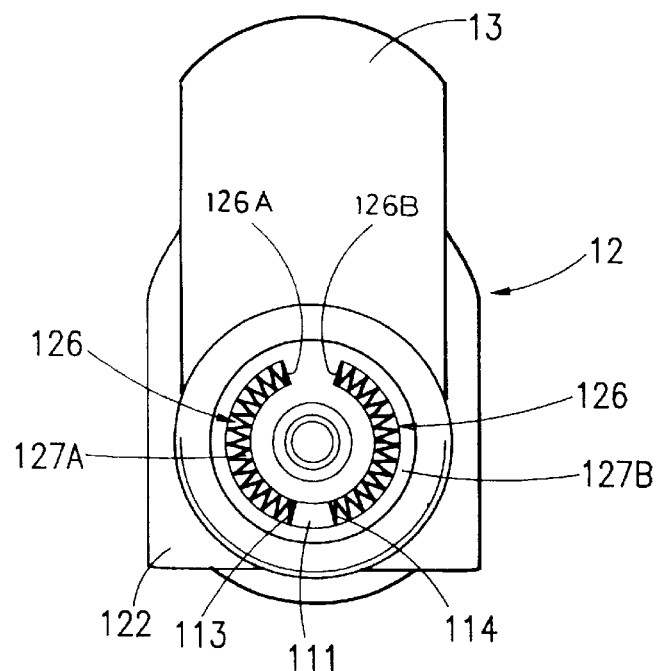
FIGS. 6A and 6B are top plan views of the swivelling wheels of the present invention in two operational status, respectively.

As shown in FIG. 6A, the end 113 of the retainer 111 is inserted into an end of the spring 127A and the other end 114 of the retainer 111 is inserted into an end of the spring 127B respectively. The other end of the spring 127A is engaged with an end 126A of the C shaped groove 126 and the other end of the spring 127B is engaged with an end 126B of the C shaped groove 126 respectively.

Figure 1:
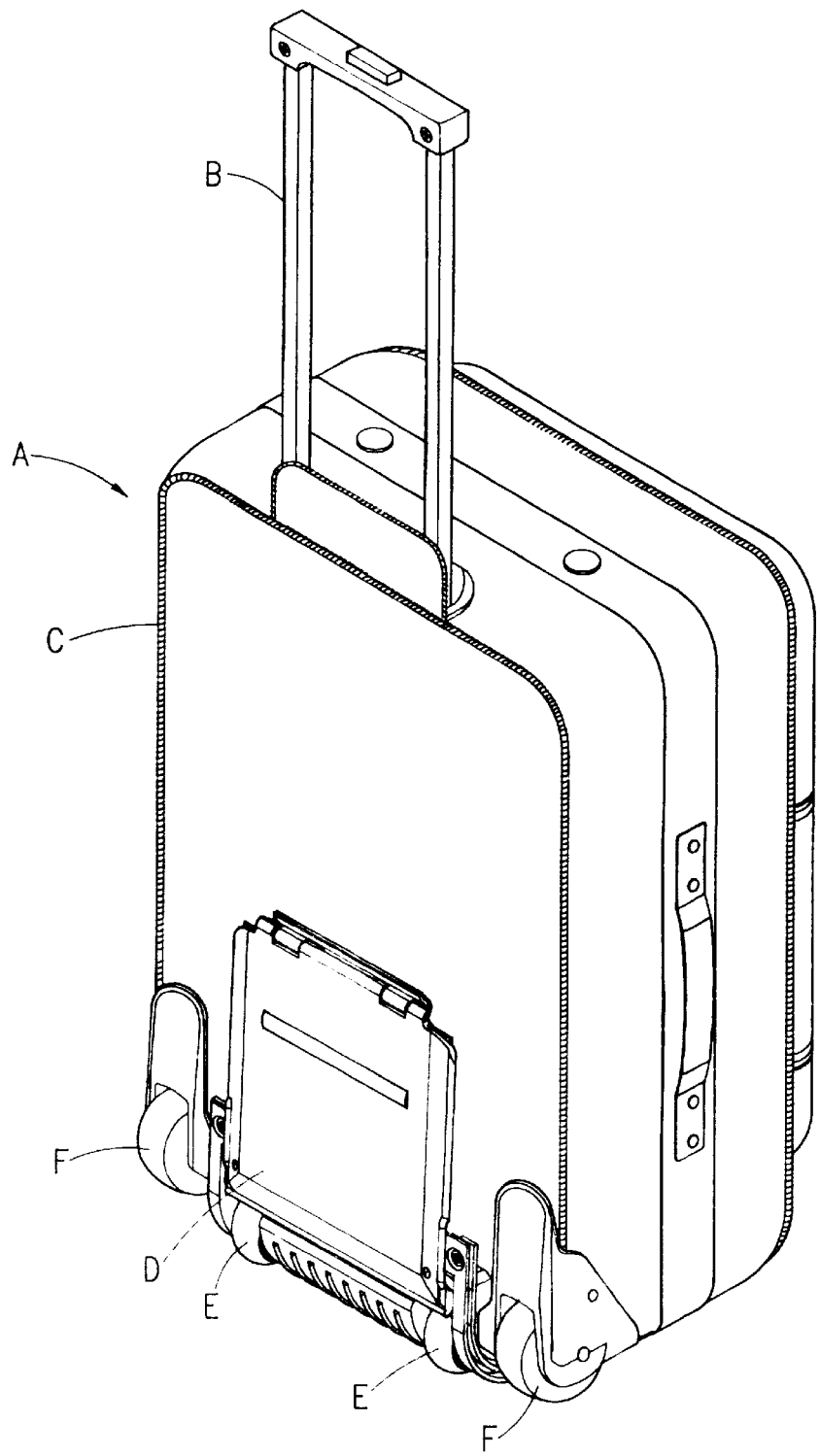
FIG. 1 is a perspective view of a four-wheeled pullman case of prior art.
Figure 2:
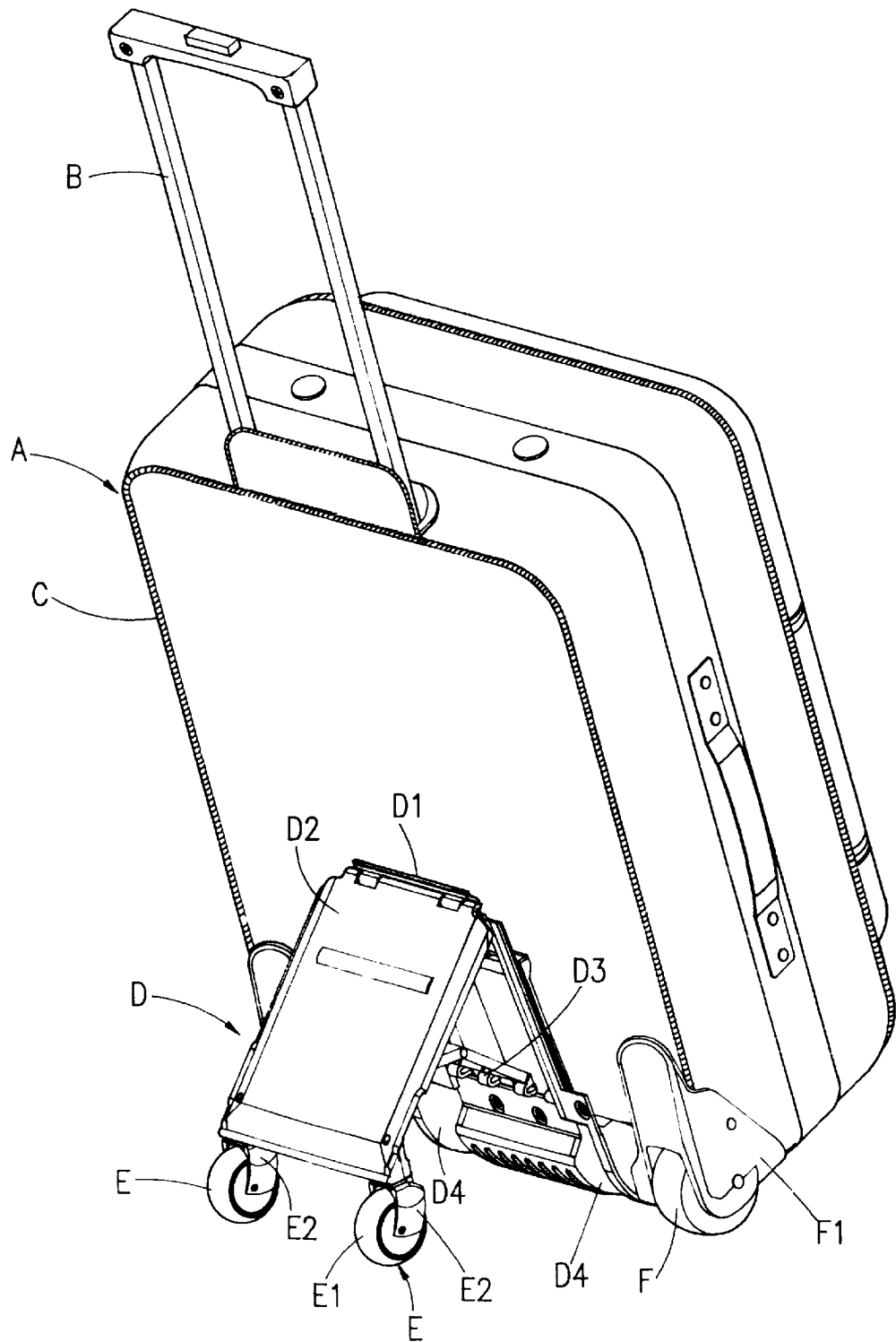
FIG. 2 is a perspective view the pullman case of FIG. 1 with the retractable swivelling wheels device extended.

When the springs 127A and 127B are uncompressed, the wheel 13 can be retracted to the recess D4 (see FIG. 2) by simply drawing the wheel bracket D back to the pullman case A through a retractable handle frame (not shown).

Figure 6B:
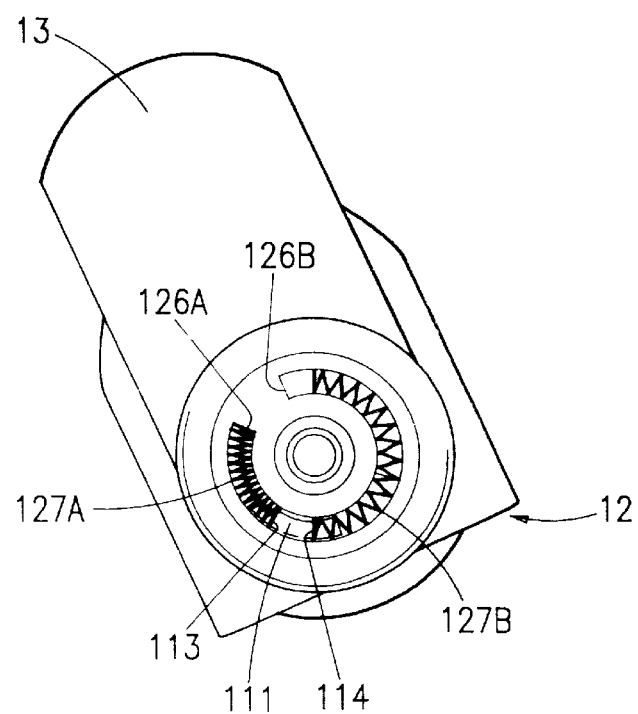

FIG. 6B illustrates a situation when the wheel rotates by the external force, as the case when the pullman case (not shown) moves in an uneven road or in a direction change. This causes the spring 127A to compress and the spring 127B to expand as been illustrated.

The springs 127A and 127B finally return to their initial shape automatically when the applying force is removed.

While the invention herein disclosed has been described by means of specific embodiments, numerous modifications and variations could be made thereto by those skilled in the art without departing from the scope of the invention set forth in the claims.

What is claimed is:

1. A pullman case steering wheels device, comprising:
   - a bushing, coupled with a wheel bracket of the pullman case, in which a spring retaining member is formed on a bottom of a circumferential flange thereof;
   - a wheel housing assembly which comprising a rotating shaft formed on a center of a surface thereof for being inserted into the bushing, a body formed under the rotating shaft, a wheel housing extended downwardly from the body with two holes formed in a center of each side thereof, a C shaped groove formed on a surface of the body opposite to the circumferential flange of the bushing, and two springs provided on the C shaped groove separated by a predetermined distance; and
   - a swivelling wheels rotatably fixed in said center hole of the wheel housing.

2. The pullman case steering wheel device of claim 1, wherein a center portion of said retainer member is disposed correspondingly with a center of the C shaped groove.

3. The pullman case steering wheel device of claim 1, wherein one end of one said spring is engaged with one end of said retaining member and one end of other said spring is engaged with the other end of said retaining member.

4. The pullman case steering wheel device of claim 1, wherein said two springs are helical springs.

* * * * *